United States Patent Office 3,522,524
Patented Aug. 4, 1970

3,522,524
GEAR PITCH COMPARISON APPARATUS
Philip Smith, James Shelley Rafferty, and Alastair Inglis, East Kilbride, Scotland, assignors to National Research Development Corporation, London, England, a British corporation
Filed June 4, 1968, Ser. No. 734,473
Claims priority, application Great Britain, June 7, 1967, 26,392/67
Int. Cl. G01m 13/02
U.S. Cl. 324—34      3 Claims

ABSTRACT OF THE DISCLOSURE

In gear pitch comparison apparatus a pair of measuring probes which are separated by the required span between gear teeth, or a multiple thereof, are alternately inserted into and withdrawn from successive gaps between the teeth as the gear wheel is rotated. The measuring probes provide a voltage signal indicative of the departure of the span of the gear teeth from a norm. This signal is applied to charge or discharge a capacitance-resistance combination for a variable time period proportionate to the speed of rotation of the gear wheel and the voltage across the capacitance at the end of the time period is measured.

---

This invention relates to gear pitch comparison apparatus. There is a requirement for apparatus capable of continuously recording the spacing errors of gear teeth, and which can be fixed relative to the axis of rotation of a gear wheel when rotated on a suitable table or the like.

Such apparatus conveniently comprises two probes which operate inductive or other transducers and which are set and calibrated to the span distance required and are presented to the gear wheel during its rotation so that the probes come to rest in selected tooth spaces. As the gear rotates, the flanks come within the range of the probes and at a predetermined position of one of the flanks a measurement of the span is taken by differential reading of the outputs of the transducers at that instant. The probes are then withdrawn and the gear continues to rotate until the next selected span is in position, when the cycle is repeated. The resulting information allows pitch errors of the spans to be calculated.

The most critical feature involved in such measurements is the technique of determining the measuring position precisely and storing the transducer outputs at that point for a length of time sufficient for recording.

According to the present invention gear pitch comparison apparatus comprises means for continuously rotating a gear wheel the spans of the gear teeth of which are to be compared with each other, a pair of measuring probes, means for inserting and withdrawing the probes into adjacent gaps between gear teeth and deriving therefrom at each insertion a voltage signal representing the difference in the gear teeth span from a norm, a storage circuit including a capacitance-resistance combination, means for applying the voltage signals across the capacitance-resistance combination during the time in which a gear tooth passes between two fixed points so as to cause the capacitance to charge or discharge towards the value of the applied voltage in that time period, and means for indicating the value of the voltage across the capacitance at the end of the time period.

In carrying out the invention a bistable circuit may be provided which causes the store to operate only when the bistable circuit is in one of its states. Triggering of the bistable circuit into and out of that state is caused by two level detectors set to different levels which operate when a position indicating signal derived from one of the teeth reaches predetermined values.

Operation of the first level detector generates a triggering signal to trigger the bistable circuit into the state which causes operation of the capacitive store and operation of the second level detector after a time period corresponding to the time of passage of the gear tooth between two fixed points triggers the bistable circuit back to its original state and thereby causes cessation of the operation of the capacitive store and also generates a transfer signal to transfer the voltage standing in the capacitive store to an indicating means.

In order that the invention may be more fully understood, reference will now be made to the drawings accompanying this specification in which.

Figure 1:
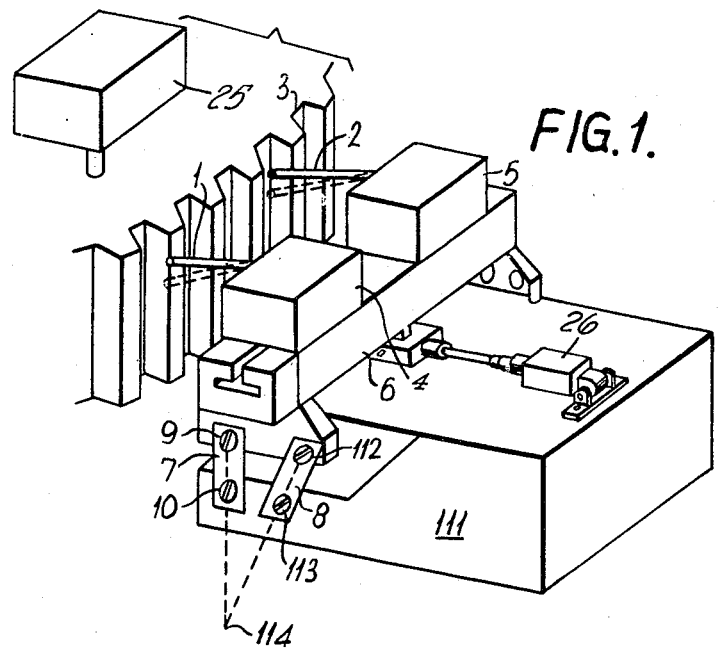
FIG. 1 illustrates diagrammatically a pair of probes embodied in gear pitch comparison apparatus.

FIG. 1 shows gear pitch comparison apparatus in which a pair of probes 1 and 2 are mounted so that they can be inserted and withdrawn into gaps between the teeth of a gear wheel 3 (shown in part) and which is mounted so as to be rotated at a constant speed by a suitable drive means 25. Probes 1 and 2 are mounted on blocks 4 and 5 which can slide on a crosshead 6 so that the span between probes 1 and 2 is accurately set to one or a multiple of the nominal span of the gear teeth.

Crosshead 6 is mounted so that it can swing and carry with it blocks 4 and 5 and thus allow probes 1 and 2 to move into and out of the gaps between the gear teeth. To this end crosshead 6 is carried on a four-bar linkage mechanism of which two bars 7 and 8 are shown in FIG. 1. Bar 7 pivots at one end about a pivot 9 on crosshead 6 and at its other end about a pivot 10 on a fixed base 111 while bar 8 pivots at one end about a pivot 112 on crosshead 6 and at its other end about a pivot 113 on base 111. The lines joining pivots 9 and 10 and the line joining pivots 112 and 113 meet at a point 114. It will thus be seen that crosshead 6 is constrained by the bars 7 and 8 and the similar pair of bars on its opposite side to rotate about an axis parallel to crosshead 6 which passes through point 114. However, the effect of the bars is to maintain the aspect of crosshead 6 and with it probes 1 and 2 constant relative to the face of gear 3 despite the rotary motion.

In operation crosshead 6 is swung successively towards and away from gear 3 by a pivot mechanism 26 so that probes 1 and 2 are inserted into successive gaps between the gear teeth as the gear rotates and then withdrawn. While in the inserted position they provide signals indicative of the departure of the span of the gear teeth from a norm.

The probes 1 and 2 can be of any suitable kind. For instance, they can be inductive probes which are deflected by the gear teeth and the degree of deflection measured by the outputs of inductive coils. The outputs are of alternating form and in one kind of probe known as "mitronic" and made by Ferranti Ltd. the outputs vary in magnitude and phase as the probe is deflected. Either parameter can be used as an indication of the deflection. Alternatively, the probes may comprise pressure transducers which direct jets of air onto the gear teeth and incorporate pressure indicating means which provide a signal representative of the back pressure in the probe dependent on the proximity of the flank of a gear tooth to the tip of the probe.

Figure 2:
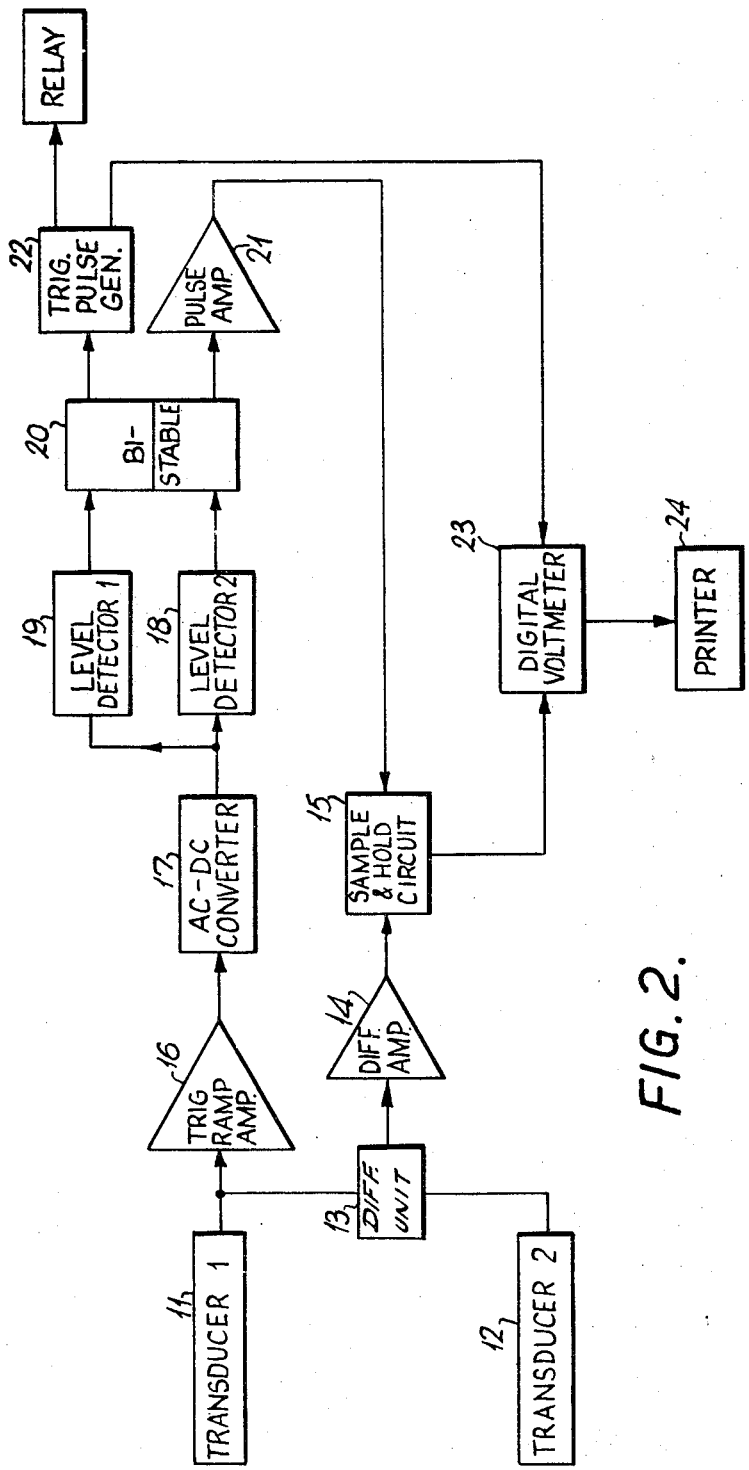
FIG. 2 is a block diagram of an electronic circuit by which the measurements are obtained.

The outputs from probe 1 and probe 2 are fed to a circuit which is illustrated in FIG. 2 in block diagrammatic form. The respective outputs of two transducers 11 and 12 associated respectively with probe 1 and probe 2 are fed to a difference unit 13 the output of which is a voltage representing the difference between the two signals. This difference signal is amplified in an amplifier 14 and passed thence to a sample and hold circuit 15 the function of which will be described.

The output of transducer 11 alone is also amplified in an amplifier 16 and if of alternating form, as will be the case if inductive probes are used, it is converted to D.C. in an A.C. to D.C. converter 17. Alternatively, if the phase charge effect is used, the output of amplifier 16 is compared in a phase-sensitive detector with an A.C. reference signal to obtain a D.C. signal the amplitude of which is a measure of the deflection. Converter 17 has its output fed to two level detectors 18 and 19 which respectively set and reset a bistable circuit 20. When bistable circuit 20 is in the set condition, a control signal is applied to sample and hold circuit 15 through a pulse amplifier 21. The resetting of bistable circuit 20 operates a trigger pulse generator 22 which triggers the read-out of a digital voltmeter 23 to a printer 24 and in addition energises relay 25 to operate the pivot mechanism 26 used to rotate the probes out of the plane of the gear wheel.

The electronic circuit of FIG. 2 is designed to cause measurement of the variations in positions of the relevant tooth flanks relative to the probes at periods of time determined by the position of one flank relative to probe 1. The determination of the periods of time at which measurement takes place is achieved by taking the output of converter 17, which is a D.C. voltage increasing with time, and represents the instantaneous position of the flank of a gear tooth, as determined by probe 1 and applying it to the two level detectors 18 and 19. Level detector 18 provides an output signal when the input voltage reaches a particular level corresponding to a particular position of a gear tooth flank. The output from level detector 18 determines the commencement of a time period of measurement and sets bistable circuit 20 so as to cause operation of the sample and hold circuit 15 to measure the output of difference amplifier 14 in a manner to be described. As the gear wheel continues to rotate the magnitude of the voltage output from converter 17 increases until eventually it reaches a level sufficient to trigger level detector 19. The output of level detector 19 determines the end of a time period of measurement and resets bistable circuit 20 to stop the operation of sample and hold circuit 15 and at the same instant triggers digital voltmeter 23 to read out the voltage standing at that instant in circuit 15. It will thus be seen that measurement is commenced when a gear tooth flank has reached a predetermined position relative to probe 1 and continues for a time corresponding to the movement of the tooth by a predetermined distance.

Figure 3:
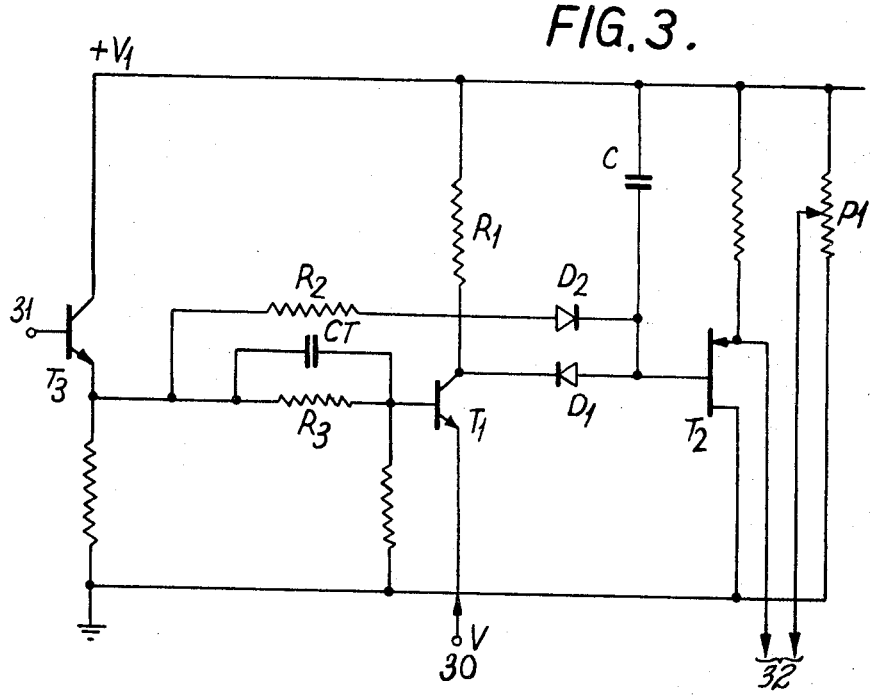
FIG. 3 is a detailed circuit diagram of a capacitive store.

Sample and hold circuit 15 is shown in greater detail in FIG. 3. This circuit comprises a transistor $T_1$ having a collector load resistor $R_1$ across which is connected a capacitor C in series with a diode $D_1$. The junction between capacitor C and diode $D_1$ is connected through a diode $D_2$ and a resistor $R_2$ to the output of an emitter follower stage comprising a transistor $T_3$. The output of pulse amplifier 21 (FIG. 2) is applied to input terminal 31 of the circuit. The output of the emitter follower stage is applied to the base of transistor $T_1$ through a resistor $R_3$ paralleled by a capacitor $C_T$. The junction between capacitor C and the diodes $D_1$ and $D_2$ is connected to the base of a field-effect transistor $T_2$ connected as a common source amplifier. The output of the circuit is then taken from the source of transistor $T_2$ to one of a pair of output terminals 32 connected to a digital voltmeter. The other output terminal is connected to a potentiometer $P_1$ which enables the reading of the digital voltmeter to be referred to any given datum. The voltage to be measured is applied at input terminal 30 connected to the emitter of transistor $T_1$.

In the quiescent state of the circuit in the absence of a sampling pulse at terminal 31 transistor $T_1$ is cut off due to the fact that its base is effectively earthed. The arrival of a sampling pulse caused by the setting of bistable circuit 20 raises the potential of input terminal 31 sufficiently to saturate transistor $T_3$ and hence transistor $T_1$. Accordingly, the collector of transistor $T_1$ takes on a potential of V volts, where V is the voltage input at terminal 30 obtained from difference amplifier 14. The voltage across the collector load resistor $R_1$ of transistor $T_1$ is $V_1-V$, where $V_1$ is the supply voltage. Both diodes $D_1$ and $D_2$ now conduct. If the voltage across capacitor C is less than $V_1-V$, capacitor C will charge towards this value through conducting diode $D_1$. Should the potential of capacitor C be greater than $V_1-V$, then, it should be noted that a discharge path is set up through diode $D_2$ and resistor $R_2$ since the emitter of emitter follower transistor $T_3$ is substantially at the potential of $V_1$ in its saturated state. In either case capacitor C will approach exponentially towards the voltage $V_1-V$ during the time that a sampling pulse is applied.

When the sampling pulse terminates, transistors $T_3$ and $T_1$ cut off so that resistor $R_2$ is returned to a potential which is substantial earth potential. Accordingly, reverse potentials are applied across diodes $D_1$ and $D_2$ and no charge or discharge path exists for the charge on capacitor C. Thus, the potential of capacitor C remains constant between sampling pulses, apart from any leakage.

The potential of capacitor C is fed to field-effect transistor $T_2$ and thence to the output terminals of the sample and hold circuit whence it is applied to a digital voltmeter at the end of each sampling period. By choosing low leakage characteristic diodes for diodes $D_1$ and $D_2$ and having the output stage of the sample and hold circuit as a common source field-effect transistor which has as one of its properties a high input impedance, the leakage of charging from capacitor C in the period between samples is kept very low.

It will be noted that since the duration of the sampling pulse is not constant, but is inversely proportional to the speed of passage of the flanks of the gear wheel, the duration of the charge or discharge of the capacitor C in the sample and hold circuit is similarly inversely proportional to speed. This allows compensation of the fact that the difference signal itself it not in practice a constant quantity but is dependent on the speed of rotation of the gear wheel. By compensating for this effect reproducible results are obtained which are independent of gear wheel speed.

We claim:
1. Gear pitch comparison apparatus comprising:
means for continuously rotating a gear wheel the spans of the gear teeth of which are to be compared with each other,
a pair of measuring probes spaced circumferentially of said gear wheel and adapted to be inserted in and withdrawn from adjacent gaps between gear teeth on said gear wheel, each of said probes including transducer means for producing an electrical signal indicative of the proximity of the flank of the gear tooth to the probe,
means for inserting and withdrawing said probes into and from said adjacent gaps,
difference means coupled to said probes for producing an electrical signal representative of the difference between the values of said signals from said transducers,
switchable storage means, including a capacitance-resistance combination, for receiving and storing said difference signal when said storage means is activated,
means for indicating the value of the signal stored in said storage means when said means for indicating is activated, and
switching means responsive to the value of the electrical signal from one of said probes when a gear tooth passes between two fixed points relative to said one probe, said switching means activating said storage means when said gear tooth passes the first of said two fixed points and deactivating said storage means and activating said indicating means when said gear tooth passes the second of said two fixed points.

2. Apparatus as claimed in claim 1 wherein said switching means comprises:
 a bistable circuit coupled to said storage means and said means for indicating such that one of the stable states of said bistable circuit activates said storage means and the other of the stable states of said bistable circuit activates said means for indicating and
 a pair of level detectors responsive to different values of said signal from said one probe, one of said level detectors being coupled to said bistable circuit to trigger said bistable circuit into said one state and the other of said level detectors being coupled to said bistable circuit to trigger said bistable circuit into said other bistable state.

3. Apparatus as claimed in claim 2 comprising in addition a trigger pulse generator responsive to said other bistable state of said bistable circuit for generating a trigger signal coupled to said means for indicating, said trigger signal being operable to transfer said signal from said storage means to said means for indicating.

References Cited

UNITED STATES PATENTS

| 2,938,275 | 5/1960 | Hofler | 33—179.5 |
| 3,263,163 | 7/1966 | Foster et al. | 324—34 |
| 3,363,113 | 1/1968 | Bedingfield | 328—151 XR |

RUDOLPH V. ROLINEC, Primary Examiner

R. J. CORCORAN, Assistant Examiner

U.S. Cl. X.R.

33—179.5; 73—162